United States Patent [19]

Hagenlocher et al.

[11] 4,329,608

[45] May 11, 1982

[54] MOUNTING FOR A BELT-DRIVEN GENERATOR

[75] Inventors: Walter Hagenlocher, Stuttgart; Heinz Hesse, Gerlingen; Rüdiger Sohnle, Stuttgart; Karl Kleebaur, Allmersbach; Christoph Kugel, Stuttgart, all of Fed. Rep. of Germany

[73] Assignee: Robert Bosch GmbH, Stuttgart, Fed. Rep. of Germany

[21] Appl. No.: 160,124

[22] Filed: Jun. 16, 1980

[30] Foreign Application Priority Data

Jun. 22, 1979 [DE] Fed. Rep. of Germany ....... 2925142

[51] Int. Cl.³ .............................................. H02K 5/00
[52] U.S. Cl. ..................................... 310/91; 474/112; 474/133
[58] Field of Search ................... 310/89, 91; 474/115, 474/112, 114, 133

[56] References Cited

U.S. PATENT DOCUMENTS 1,174,551  3/1916  Dodge ................................. 474/112

Primary Examiner—J. V. Truhe
Assistant Examiner—Morris Ginsburg
Attorney, Agent, or Firm—Frishauf, Holtz, Goodman & Woodward

[57] ABSTRACT

The casing of the electric generator of a motor vehicle is made of two cylindrical shells, one located eccentrically with respect to the other, connected together by struts to provide a light-weight rigid relation between the two belts. The casing is then mounted in a saddle-shaped support affixed on a mounting surface. Because of the eccentric position of the generator shaft within the outer cylindrical shell of the casing, loosening the tension band that holds the generator in place and rotating the casing of the generator makes possible tightening or loosening of the V-belt that drives the generator.

4 Claims, 3 Drawing Figures

MOUNTING FOR A BELT-DRIVEN GENERATOR

This invention concerns a mounting of a belt-driven electrical generator, such as the generator of a motor vehicle, where it is useful to shift the position of the generator with respect to its supports in order to tighten the V-belt by which it is driven.

The V-belt of a motor vehicle's generator is usually driven by the crank shaft of the motor and usually operates other devices such as the water pump and the fan. In order to set the tightness of the belt without requiring an additional adjustable idler pulley, one or another of the driven devices can be mounted shiftably so as to provide for setting the desired tension of the drive belt. This function usually devolves upon the generator because it is big enough to incorporate a sturdy shiftable mount and small enough to be displaced with proper tools so as to be set the tension of the belt. The belt must be tight enough for efficient delivery of drive power, but loose enough to avoid excessive wear and frictional resistance.

Accordingly, the generators of motor vehicles are often equipped with a pivot arm by means of which the generator can be swung about a pivot axis parallel to the generator shaft and a holding arm by which the belt tension set by swinging the generator about its pivot by its pivot arm can be firmly fixed.

In operation the generator of a motor vehicle is exposed to high shaking stresses. In order to reduce these shaking stresses, efforts have been made to seat the generator in a saddle-shaped member into which the generally cylindrical main body of the generator fits. A disadvantage of such an arrangement is that it has heretofore been practically impossible to provide mounting of a vehicle generator in a saddle-shaped member which also allows shifting of the generator to tighten the drive belt.

SUMMARY OF THE INVENTION

It is an object of the invention to provide a mounting for the generator of a motor vehicle in which the reduction of shaking stresses characteristic of a saddle-shaped seating member can be obtained, while at the same time it is possible to displace the generator in such a manner as to set the drive belt tension.

Briefly, the casing of the generator, besides having a housing 11 has also a cylindrical casing 12, the axis of which is parallel to and eccentrically located with respect to the axis of the generator shaft 18. The cross-section of the outer cylindrical portion of the casing 12 preferably has a circular cross-section. The cylindrical outer shell 12 preferably is connected to the housing 11 of the machine by struts 41. In a particularly preferred form, the outer cylindrical casing 12 and the inner housing 11 are constituted as an integral piece preferably made by a continuous casting process. Preferably this unitary piece constituting the generator housing 11 and the outer cylindrical casing 12 is provided with cavities 13 for fastening elements for the bearing plates 14, 15 and/or other holding devices useful in a machine casing.

The advantage of the invention is that the generator is held securely in the saddle support so as to reduce exposure to shaking stresses, while at the same time the tension of the driving belt can readily be adjusted by simply rotating the cylindrical unit that contains the generator mounted eccentrically therein.

BRIEF DESCRIPTION OF THE DRAWINGS

The invention is further described by way of illustration with reference to the annexed drawings in which.

DESCRIPTION OF A PREFERRED EMBODIMENT

Figure 1:
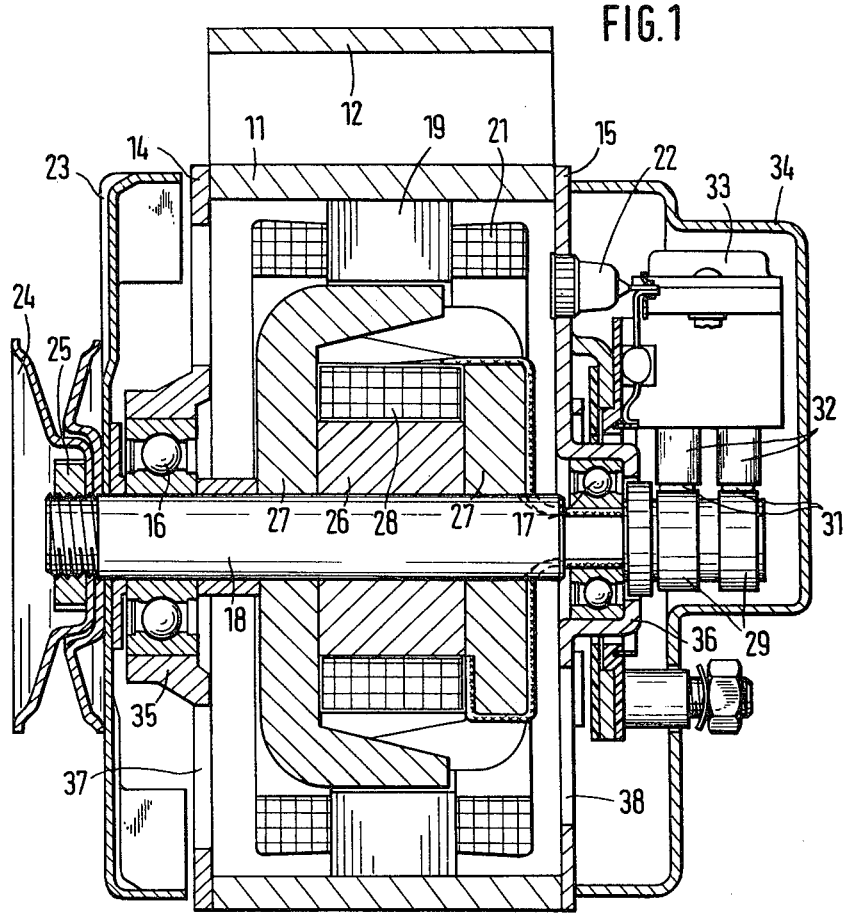
FIG. 1 is a longitudinal cross-section of a generator of the type to which the invention is applicable.

FIG. 1 is a longitudinal section of a three-phase alternating current generator typical of the electrical generators being produced today for motor vehicles. The casing of this generator comprises a shell 11, which in a plane perpendicular to that of the drawing would show a circular cross-section for the periphery 12. On the drive end of the shell 11 is fastened a first bearing plate 14 and on the other end a second bearing plate 15.

The bearings 16 and 17 which serve to hold the generator shaft 18 are respectively set in the bearing plates 14 and 15.

Just within the shell 11 is a stator 19, which together with its stator winding 21 is pressed into the shell. The stator winding 21 supplies current to a rectifier unit utilizing rectifier diodes 22 set in the second bearing plate 15. On the end of the shaft 18 to which the driving force is applied are located a ventilating fan wheel 23 and a belt pulley 24, both held fast to the shaft with the help of a nut 25. The shaft 18 carries a rotor having a core 26, pole wheels 27 of the interdigital claw-pole type and an exciter winding 28. The ends of the exciter winding 28 are connected to slip rings 29 which are likewise set on the shaft 18.

Carbon brushes 31 are in contact with the slip rings 29 as the result of being held in a brush holder 32. The brush holder 32 is connected electrically to a voltage regulator 33. The electrical parts of the generator are protected from dirt and damage by a cover 34. The bearings 16 and 17 are set in bearing bushings 35 and 36 respectively, the latter being components of the respective bearing plates 14 and 15. Apertures 37 and 38 respectively in the bearing plates 14 and 15 allow for the flow of air through the machine.

Figure 2:
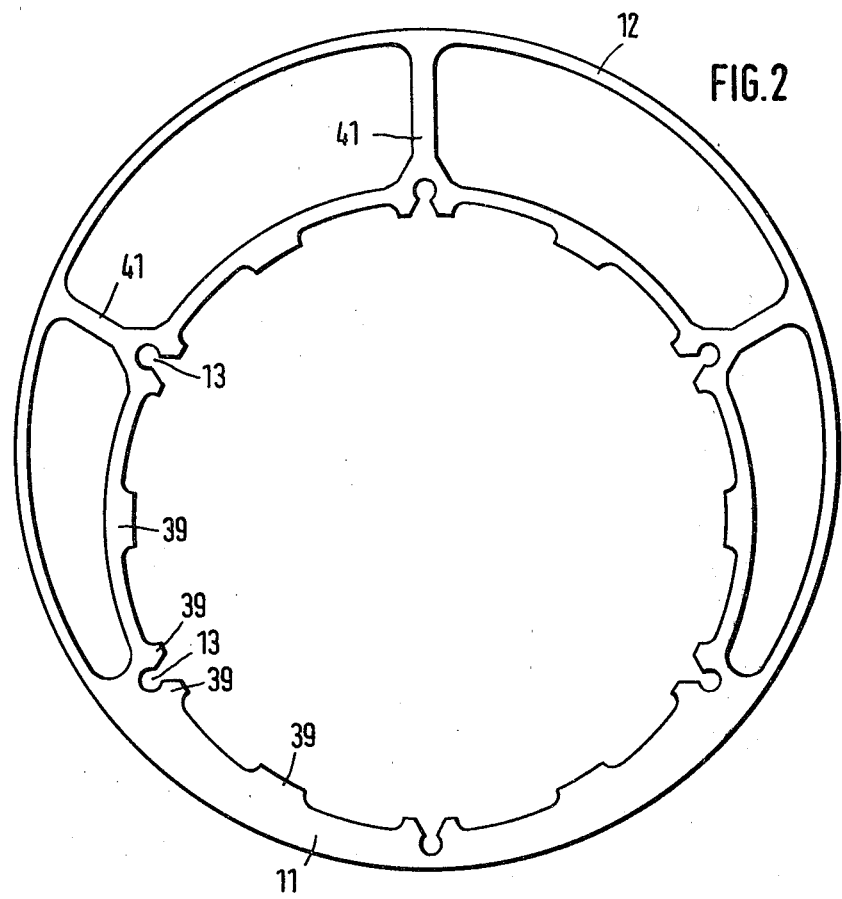
FIG. 2 is a diagrammatic cross-section of the outer cylindrical casing and the motor housing formed integrally of one piece with connecting struts.

FIG. 2 shows the housing shell 11 together with the eccentric cylindrical shell 12 by themselves in an axial view. The cavities 13 provide passages for screws not shown in the drawing in order to fasten the bearing plates 14 and 15 (FIG. 1) to the casing shell 11. Inwardly extending tabs 39 serve for holding the stator 19 (FIG. 1) in fixed position. The eccentric cylindrical shell 12 is connected with the housing shell 11 by struts 41.

Figure 3:
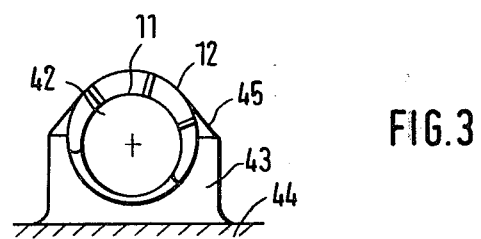
FIG. 3 is a diagram showing the mounting of the motor within a saddle-shaped support affixed to a support surface.

FIG. 3 shows the mounting of the complete generator 42 which has the housing shell 11 and an eccentric cylinder shell 12, mounted in a saddle support 43 that is affixed to a base 44 which may, for example, be the engine block of a motor vehicle. A tension band 45 or a pair of them in line serves to hold the generator 42 fast in the saddle-shaped support 43. As already explained, all that is needed to adjust the tension of the V-belt (not shown) that drives the drive pulley 24 (FIG. 1) is to loosen the tension band 45 (FIG. 3) and to rotate the generator unit in the saddle support. Because of the eccentric position of the generator shaft within the cylindrical shell 12, such action can be used to tighten or loosen the V-belt by moving the pulley outwards or inwards with respect to the configuration of the V-belt loop (not shown).

Although the invention has been described with reference to a specific illustrative embodiment, it will be understood that variations are possible within the inventive concept.

We claim:

1. A belt-coupled electrical machine having a casing, a rotary shaft and a belt-pulley mounted on said shaft for use in a vibratory environment on a saddle-shaped mounting having a seating surface in the shape of a portion of a cylinder of circular curvature, said machine having the improvement which consists that its casing comprises an inner shell (11) substantially coaxial with said shaft and an outer cylindrical shell (12) affixed or made integral with said inner shell (11) and having its axis parallel to said shaft and eccentrically located with reference to said inner shell (11), said outer cylindrical shell (12) being the same radius of curvature as that of said surface of said saddle-shaped mounting.

2. An electrical machine as defined in claim 1 in which at least one cavity is provided between said inner and outer shells of said casing and in which struts (41) are provided for connecting and spacing said shells.

3. An electrical machine as defined in claim 1 in which said inner and outer shells of said casing are made in one piece and in which both shells are cylindrical.

4. An electrical machine as defined in any one of claims 1-3 in which said casing is provided on at least one of said shells, provided with cavities for the passage of fastening means for attaching at least one bearing plate (14, 15) for said shaft and at least one other internal component of said machine.

* * * * *